Dec. 14, 1965        J. W. LUCAS        3,222,981

TWO-ELEMENT PROJECTION LENS

Filed Nov. 24, 1961

LONGER CONJUGATE TOWARD IMAGE →

James W. Lucas
*INVENTOR.*

United States Patent Office 3,222,981
Patented Dec. 14, 1965

3,222,981
TWO-ELEMENT PROJECTION LENS
James W. Lucas, 1122 S. Robertson, Los Angeles, Calif.
Filed Nov. 24, 1961, Ser. No. 157,027
9 Claims. (Cl. 88—24)

This application is a continuation-in-part, of my earlier application S.N. 758,462, filed September 2, 1958, now abandoned, for Two Element Projection Lens.

This invention relates to image-forming optical systems used for the projection of transparent pictures, and more particularly, to those systems in which a light-gathering member concentrates the projected light beams into the area of the projection lens.

At present, projection lenses differ from camera lenses primarily in that their corrections are for light issuing from the direction of the shorter conjugate. Normal projection lenses also cover a generally smaller angular field than normal camera lenses. However, all areas of both camera and projection lenses presently require corrections for light rays issuing from all parts of the object, since focusing changes the lens location relative to the condensing system.

The disadvantages of focusing requirements are most apparent when so-called "overhead projectors" are considered. These machines use condensing systems which concentrate the ray bundle into an angular field of approximately 50°. A projection lens of about 14 inch focal length is commonly used, and focusing between normal screen distances of 4 to 21 feet requires lens movement of 5 inches along the optical axis. This amount of axial motion in the area of the ray cone apex requires a 4-inch diameter lens to encompass the cone throughout the focusing range. Since the entire projection head is moved to focus the lens, a large first-surface mirror is required, and rack and pinion focusing is necessary because of the weight being moved. The head must be large enough to enclose the mirror, and thus becomes an obstruction to viewing of the screen by the audience.

The penalties of full-area optical correction on a 4 inch diameter lens are also readily seen. This requires at least 3 elements in the projection group, and involves increased cost, size and weight.

A principal object of my invention is to provide a projection system of lenses which achieves satisfactory correction, and focusing, without the necessity for resorting to the use of 3 elements in the projection lens group.

The invention embodies the concept that by avoiding the necessity for focusing a lens for projection to screens at different distances, it will be satisfactory to correct each area of the projection lens only for those light-rays reaching that area from a corresponding area of the light-gathering, or condensing, system. This type of correction allows the use of a simplified lens construction, wherein two elements are sufficient to correct for spherical and chromatic aberrations to an acceptable level.

My invention makes it possible to utilize a two-element projection lens construction while providing for focusing. This is accomplished by using a characteristic of the condensing system (the position of the image of the lamp filament) to locate the projection lens group (e.g. by arranging one element of the projection lens in fixed relation to the light rays from the condensing group).

My invention provides an approach to the design of such a projection lens, establishing design criteria required to adapt this type of lens to any combination of condensing systems and focal distances. I will indicate a specific example of a typical lens designed by this method, but it should be realized that a basic non-dimensional form cannot be set forth for scaling to various focal lengths, since the condensing system and focusing range involve integral design information. I aim to provide a projection lens which can be focused without changing its location relative to the light cone issuing from the condensing system of the projector.

A further object is the provision of a projection lens which allows a smaller mirror and head to be used on "overhead projectors," reducing cost, weight and viewing obstruction, while permitting stowage of the projection head and supporting tube inside the machine.

Another object of this invention is to provide a projection lens which forms a larger image than normal when the projection distance is short, and a smaller image than normal when the projection distance is long.

Still another object is the provision of a projection lens with an external field stop of small diameter, without a decrease in the image intensity. This feature allows the use of small auxiliary lenses, tachistoscopes and filters.

Yet another object of my invention is to make possible the design of very wide angle projection lenses without vignetting, or appreciable light loss at the outer edges.

A further object is to provide a projection lens comprising only two elements, and yet corrected for spherical and chromatic aberrations.

The lens of my invention is best described as a variable focal length projection lens, in which the shorter conjugate remains substantially constant. This condition can be satisfied by moving either the convergent or divergent component while the other remains stationary, or by moving both components in a predetermined relationship to each other. In the particular embodiment herein described, the divergent component is held stationary.

The example shown in the accompanying drawings is used with a shorter conjugate, or distance to the object focal plane, of 12.15 inches measured from the crown of the negative element, along the optical axis. A condensing lens of 14 inch diagonal width is located just behind the focal plane, and forms an image of the lamp filament 15.28 inches from the focal plane. The ray bundle at the convex surface of the negative element is 3.00 inches wide. A variation of 1.00 inch in the separation between components is sufficient to change the distance of the longer conjugate from 4 feet to 21 feet. At the 4 foot distance, the equivalent focal length of the projection lens is 11.7 inches. When focused for the 21 foot distance, the focal length becomes 13.6 inches.

In the particular embodiment shown in the accompanying drawings, a negative meniscus element is shown in combination with a substantially planoconvex positive element. This configuration is a result of a series of calculations which are described as follows:

A projection lens is to be designed to allow a variation in image distance from 4 to 21 feet. This is to be accomplished by keeping the element nearest the object plane in a fixed relationship to that plane, and by allowing a total focusing motion of the other element of one inch.

As stated on page 81 of F. N. Sears Optics, Addison-Wesley Press, Inc. 1946, the reciprocal of the focal length of a lens equals the sum of the reciprocals of the conjugate distances, or $$\frac{1}{S}+\frac{1}{S'}=\frac{1}{F}$$

Equating the limiting conditions for focus:

$$\frac{1}{fp} = \frac{1}{48} + \frac{1}{d+1} = \frac{1}{252} + \frac{1}{d}$$

$d$ then = 7.21 inches, and $fp$=7.00 inches, where $d$ represents the distance from the positive lens to the vertical image.

The movable positive lens thus has a focal length of 7.00 inches, and requires a fixed virtual image 7.21 inches from it when focused on a screen 252 inches away.

Since this lens is to be used on an overhead projector, both elements should be kept within the condenser light cone, leaving the apex beyond the lens. This arrangement allows use of a minimum size mirror and "head." The Fresnel condenser forms an image of the lamp filament at a point 15.28 inches from the object plane so the negative element is placed 12.50 inches from the object plane. The positive element is placed 1.00 inch from the fixed negative element when focused at the 21 foot screen distance, and the negative element is thus 6.21 inches from the virtual image it must form.

$$\frac{1}{f_n} = \frac{1}{12.50} - \frac{1}{6.23}; \; f_n = -12.35 \text{ inches}$$

To obtain color correction, an average separation of elements of 1.50 inches is used, and the formula applied as found on page 501 of "Mirrors, Prisms and Lenses" by J. P. C. Southall, Macmillan Co., 1954.

$$C = \frac{V_1 f_1 + V_2 f_2}{V_1 + V_2}$$

where C is the separation, and $V_1$ and $V_2$ the Abbe dispersion numbers. Using $N_d$=1.517/64.5 borosilicate crown glass for the positive element, extra dense flint ($N_d$=1.786/25.6) is indicated for the negative element.

Using the vertex of negative lens surface number one at 12.15 from the object plane, design an "aplanatic" lens (p. 618, Southall) by using the center of $r_1$ at the lamp filament image. This gives $r_1$=3.13 inches. $r_2$ is then found by the thick lens equation in "Fundamentals of Optical Engineering" by Jacobs, McGraw-Hill, 1943:

$$\frac{1}{f} = (n-1)\left[\frac{1}{r_1} - \frac{1}{r_2} + \frac{t(n-1)}{nr_1 r_2}\right]$$

choosing thickness $t$=.15, $r_2$ is found to be 2.32 in.

The "principal points" of the negative lens are then found (p. 363, Southall) and the positive lens vertex located 1.50 inches away. Again applying the conjugate distance equation for the intermediate location of the positive element, it is found that the image distance is 76.0 inches. Using S' as 4 times this image distance, find $r_3$ from the following equation (p. 57, Sears):

$$\frac{n}{s} + \frac{n^1}{s^1} = \frac{n^1 - n}{r}$$

$r_3$ then = 3.87 inches and $r_4$, from Jacob's thick lens equation, is found to be −53.58 inches.

It may be found necessary to conduct traces of the marginal rays, and to make minute adjustments of $r_3$ and $r_4$ for improved control of aberrations. However, marginal rays exist only close to the optical axis, as bounded by the lamp filament image, so that ray tracing problems are held to a minimum.

Figure 1:
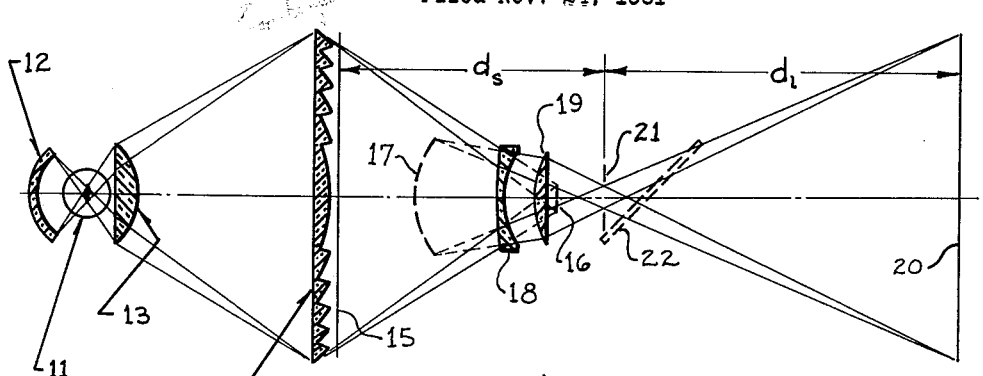
FIGURE 1 is a cross-section showing the application of my projection lens in a typical overhead projector optical system.

In the drawing, only the essential optical elements are illustrated. All supporting structures and enclosures have been eliminated for the sake of clarity.

In FIGURE 1, a typical overhead projector optical system is shown. Light issues from projection bulb 11, and, with the rear portion reflected from concave reflector 12, is concentrated by small condensing lens 13 into the area of large condensing lens 14. This is generally a Fresnel type as shown. A 45° mirror is usually used between the two condensing lenses for folding the optical path, but is not an essential element of the optical system. The light hitting large condensing lens 14 is converged by it into the area of projection lenses 18 and 19 by forming an image 16 of the filament of projection bulb 11. An object to be projected is located at focal plane 15. Negative element or divergent component 18 forms a curved virtual image 17 of the object at focal plane 15. Positive element or convergent component 19 forms a flat screen image 20 from curved virtual image 17. Lens elements 18 and 19, the image-forming or projection group concentrate the ray bundle into a small area at field stop 21. Head mirror 22 is shown in phantom, since its size is affected by the lens design, but it is not a fundamental part of the optical system. $d_s$ is the shorter conjugate, and $d_l$ is the longer conjugate.

Figure 2:
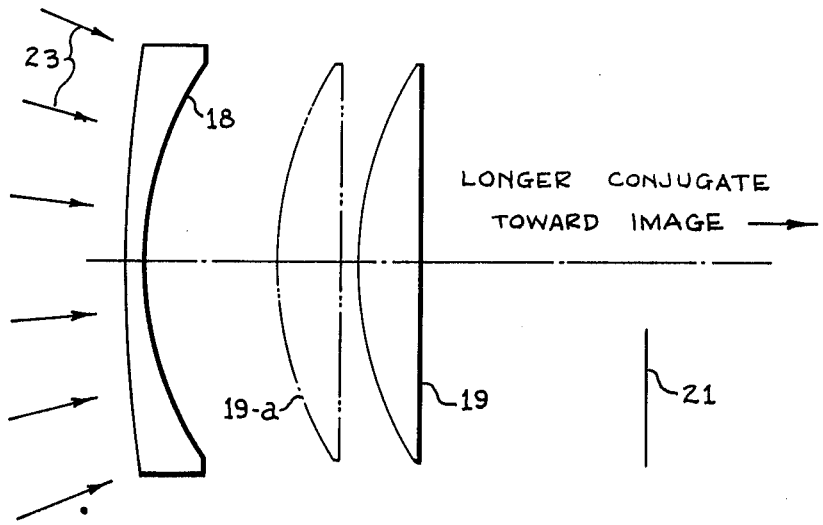
FIGURE 2 is a cross-section of the two lens elements, with the movable positive element shown by solid lines for near projection, and by phantom lines for distant projection.
Figure 3:
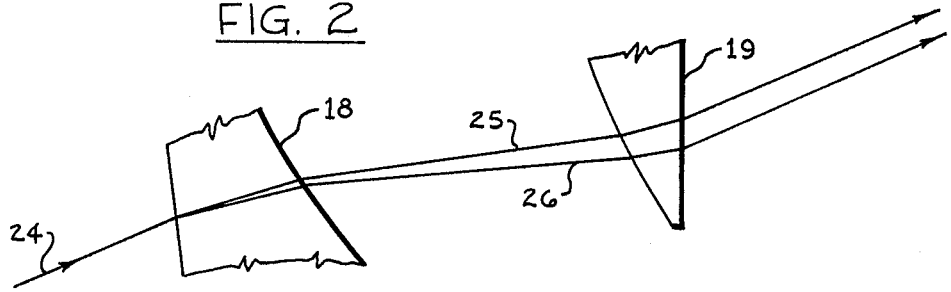
FIGURE 3 is a further detailed cross-section of the edges of two lens elements, showing the dispersion and achromatizing of a typical light ray.

FIGURE 2 illustrates how individual portions 23 of the converging ray bundle enter negative element 18 first, then continue toward positive element 19. Rays from a common point on focal plane 15, after passing through negative element 18, approach positive element 19 in a divergent manner, as illustrated in FIG. 3, so that motion of the positive element to position 19-a causes the divergent light rays to pass through poistive element 19 at points closer together. This causes the rays to focus at a screen located further from the lens.

In FIGURE 3, monochromatic light 24 issuing from large condensing lens 14, passes through negative element 18 and is dispersed into a spectrum including a red ray 25 of longer wavelength, and a violet ray 26 of shorter wavelength. Since there is an appreciable air separation between lens elements 18 and 19, rays 25 and 26 have separated by the time they enter positive element 19. The curvature of positive element 19 is chosen to that rays 25 and 26 will issue from element 19 as parallel rays, thus effecting correction for chromatic aberration.

Since the lens element 18, which receives the light rays from condensing lens group 13, 14, remains at a fixed distance from that group along the optical axis, the same portions of the condensed light ray bundle will always pass through the same areas of lens 18, and consequently, spherical aberration will not occur to an objectionable extent as the result of the focusing adjustment of lens 19.

Where the terms "substantially plano-", "substantially plane" and "substantially flat" are used herein to designate one face of the positive lens element of the projection group, such term is intended to designate the range of flatness defined as: $r > \pm 4f_p$, where $r$ designates the radius of curvature of such face, and $f_p$ designates the focal length of the positive element.

In order to comply with the statute this invention has been described in terms of one particular embodiment, but it is to be understood that the same may be varied, within the scope of the appended claims, without departing from the spirit of the invention.

I claim:

1. In a projection system substantially corrected for spherical and chromatic aberration, in combination: a condensing means adapted to condense the rays from a light source through a transparent object, the combination of wide-angle projection lens elements having a maximum diameter less than one-half object width, consisting of a negative lens positioned in fixed axially spaced relation to said condensing means, and a positive lens disposed in spaced relation to said negative lens on the side thereof remote from said condensing means, said positive lens being adjustable to varying distances from said negative lens for focusing, said negative lens being so positioned with reference to said condensing means that light rays from each small area of said object will pass through a corresponding small area of said negative lens, which area does not change during focusing.

2. A projection system as defined in claim 1, wherein both of said lenses have convex surfaces facing toward the object plane.

3. A projection system as defined in claim 1, wherein said lenses are so positioned with relation to said condensing means that all light rays projected beyond the positive lens will pass through a circle of less than half the diameter of the positive lens, in a plane of maximum convergence.

4. In a projection system substantially corrected for spherical and chromatic aberration, in combination: a condensing means adapted to condense the rays from a light source through a transparent object, a negative lens positioned in fixed axially spaced relation to said condensing means, and a positive lens disposed in spaced relation to said negative lens on the side thereof remote from said condensing means, said positive lens being adjustable to varying distances from said negative lens for focussing, said negative lens being so positioned with reference to said condensing means that light rays from each small area of said object will pass through a corresponding small area of said negative lens, which area does not change during focusing, said lenses being so related to said condensing means that all light rays projected beyond the positive lens will pass through a circle of less than half the diameter of the positive lens, in a plane of maximum convergence, and said lenses being separated by an air space of more than 5% but less than 35% of the focal length of said positive lens.

5. A projection system as defined in claim 4, wherein said negative lens has a convex surface of about .45 $fp$ radius nearest the object plane and a concave surface of about .33 $fp$ radius nearest the image plane, and wherein said positive lens has a convex surface of about .55 $fp$ radius nearest the object plane and a convex surface of about minus 7.66 $fp$ nearest the image plane, where $fp$ represents the focal length of the positive lens.

6. A projection system as defined in claim 5, wherein the positive lens has an index of refraction of 1.517 and an Abbé dispersion number of 64.5, and wherein said negative lens has an index of refraction of 1.786 and an Abbe dispersion number of 25.6.

7. In a projection system substantially corrected for spherical and chromatic aberration, in combination: a condensing means adapted to condense the rays from a light source through a transparent object, and a wide angle two-element projection lens of maximum diameter less than one-half object width, consisting of a fixed negative meniscus element nearest the object plane, and a movable positive element nearest the image plane, each of said elements having a convex surface facing the object plane, and said condensing means being effective to form a projected image of a light source beyond said positive element, said negative element being so positioned with reference to said condensing means that light rays from each small area of said object will pass through a corresponding small area of said negative element, which area does not change during focusing.

8. In a projection system substantially corrected for spherical and chromatic aberration, in combination: a condensing means adapted to condense the rays from a light source through a transparent object, a two-element projection lens comprising a fixed negative meniscus element nearest the object plane, and a movable positive element nearest the image plane, each of said elements having a convex surface facing the object plane, the focal length of said negative element being greater than minus 1.1 but less than minus 1.4 times the focal length of said positive element multiplied by average separation of said elements, said negative element being so positioned with reference to said condensing means that light rays from each small area of said object will pass through a corresponding small area of said negative element, which area does not change during focusing.

9. In a projection system substantially corrected for spherical and chromatic aberration, in combination: a condensing means adapted to condense the rays from a light source through a transparent object, a two-element projection lens consisting of a fixed negative meniscus element nearest the object plane, and a movable positive element nearest the image plane, each of said elements having a convex surface facing the object plane, the radii of curvature of said negative element being such that $$\frac{R \text{ convex}}{(R \text{ convex} - .5R \text{ concave})(n_\text{d} - 1)}$$

is greater than 1.50 but less than 3.00, said negative element being so positioned with reference to said condensing means that light rays from each small area of said object will pass through a corresponding small area of said negative element, which area does not change during focusing.

References Cited by the Examiner

UNITED STATES PATENTS

| | | | |
|---|---|---|---|
| 1,879,737 | 9/1932 | Del Riccio | 88—24 |
| 1,863,099 | 6/1932 | Bowen | 88—57 X |
| 2,048,284 | 7/1936 | Newcomer. | |
| 2,209,532 | 7/1940 | Michel | 88—39 |
| 2,787,935 | 4/1957 | Inoue | 88—57 X |
| 2,800,052 | 7/1957 | Beachtold et al. | |
| 2,889,745 | 6/1959 | Hayes et al. | 88—57 |

FOREIGN PATENTS

| | | |
|---|---|---|
| 944,880 | 11/1948 | France. |
| 20,151 | 9/1912 | Great Britain. |
| 408,406 | 4/1934 | Great Britain. |

NORTON ANSHER, *Primary Examiner.*

WILLIAM MISIEK, JEWELL H. PEDERSON, *Examiners.*